United States Patent Office 3,031,464
Patented Apr. 24, 1962

3,031,464
ALKOXY-NAPHTHALENES
Hyman M. Molotsky, Chicago, Ill., assignor to Velsicol Chemical Corporation, Chicago, Ill., a corporation of Illinois
No Drawing. Filed Nov. 28, 1958, Ser. No. 776,729
6 Claims. (Cl. 260—346.2)

This invention relates to new halogenated compositions of matter. In particular, this invention relates to new, unique halogenated ethers possessing advantageous insecticidal activity and which are also extremely useful as intermediate chemicals. This application is a continuation-in-part of my copending application Serial No. 651,173, filed April 8, 1957, now abandoned.

The presence of an ether group results in novel compositions which possess unexpectedly high toxicity to certain specific organisms and in addition have other highly desirable properties, particularly those relating to solubility. These enhanced characteristics promoted by the presence of the ether group will also be retained in compounds prepared from this valuable composition by epoxidation, halogenation, and other reactions which do not impair the configuration of said compositions.

While the new ethers are most desirable compositions, their preparation did not appear to be feasible in a direct process on the basis of the work of Krynitsky and Bost, 69 J.A.C.S. 1918. This reaction of Krynitsky et al. produced a ketal and not the ether which would be operable in the present invention to prepare the desired compositions. Thus, the literature discloses the extreme difficulty in preparing the new compositions of this invention.

It is therefore an object of the present invention to produce new halogenated ethers.

Another object of the present invention is the preparation of new insecticidally active compositions of matter.

Still another object of the present invention is the preparation of a new organic composition of matter from which other valuable compositions of matter may be prepared.

Other objects of the present invention will become apparent from the ensuing description.

Unexpectedly, it has been found that the new compositions of matter may be prepared by reacting hexachlorobicyclo-(2.2.1)-heptadiene with an organic alcohol in the presence of an alkaline reacting material such as potassium or sodium hydroxide, and adducting this product with a conjugated diene, particularly cyclopentadiene, methyl cyclopentadiene, butadiene, and furan, in a Diels-Alder manner.

From the literature it would be expected that this reaction of hexachlorobicyclo-(2.2.1)-heptadiene with an organic alcohol would result in either a ketal by means of the replacement of both bridge chlorine atoms or in no reaction. It is certainly unusual and unexpected that only one said chlorine atom should be replaced, resulting in the preparation of the desired ethers.

The scope of this novel reaction is not limited by the size or structure of the organic alcohol. Thus, aliphatic hydrocarbon alcohols containing up to 14 carbon atoms are operable herein.

The starting material, hexachlorobicyclo-(2.2.1)-heptadiene can be prepared in known manner, such as by the dehydrohalogenation of the equimolar Diels-Alder adduct of hexachlorocyclopentadiene and vinyl chloride, and is not critical to the present invention.

The following examples illustrate the preparation of the new compositions of the present invention but should not be construed as imposing limitations on the scope of the present invention.

EXAMPLE I

Preparation of 1,2,3,4,7-Pentachloro-7-Isopropoxybicyclo-(2.2.1)-2,5-Heptadiene 1,2,3,4,7,7-hexachlorobicyclo-(2.2.1) - heptadiene (604 grams; 2.02 mol) was placed in a three-necked reaction vessel equipped with stirrer, thermometer, heating mantle and reflux condenser and containing potassium hydroxide (190 grams; 2.90 mol) and isopropyl alcohol (868 grams; 14.4 mol). The reaction mixture was heated to reflux, approximately 90° C., and maintained at reflux for about four hours.

The unreacted material was removed by distillation under reduced pressure and the residue was then dissolved in diethyl ether. This ether solution was washed with water, dried over anhydrous sodium sulfate and the diethyl ether removed by distillation under reduced pressure. The desired product was recovered by fractionation of the residue of the diethyl ether removal as the fraction with a boiling point of 99–105° C. at 0.8 mm. of Hg pressure. This crude product was purified by chromatographic means. Its boiling point was found to be 105° C. at 0.8 mm. Hg and its refractive index $N_D^{20}$ 1.5213.

The compound was analyzed for $C_{10}H_9Cl_5O$:

|  | C | H | Cl |
|---|---|---|---|
| Theoretical | 37.24 | 2.81 | 54.97 |
| Found | 36.89 | 2.85 | 55.43 |

Its structure is:

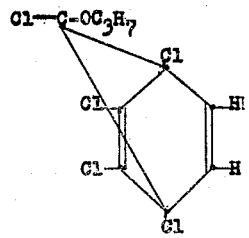

EXAMPLE II

Equimolar Adduction of 1,2,3,4,7-Pentachloro-7-Isopropoxybicyclo (2.2.1)-2,5-Heptadiene and Cyclopentadiene 1,2,3,4,7-pentachloro-7-isopropoxybicyclo (2.2.1)-2,5-heptadiene (94.5 grams; 0.29 mol) was placed in a three-necked glass reaction vessel equipped with stirrer, thermometer, heating mantle and addition funnel and heated to 130° C. Cyclopentadiene (31.9 grams; 0.49 mol) was added from the addition funnel into the reaction vessel uniformly over a period of 1½ hours. The reaction mixture was maintained at 130° C. for an additional 3 hours after the completion of the cyclopentadiene addition. The desired product was obtained by fractionation of the reaction mixture as the fraction boiling at 130–131° C. at 0.2 mm. Hg pressure and having a refractive index of 1.5554 (at 20° C.). The product, 1,2,3,4,10-pentachloro - 10-isopropoxy-1,4,4a,5,8,8a-hexahydro-1,4,5,8-dimethanonaphthalene, solidified on standing and was found to have a melting point of 71–73° C.

The product was analyzed for $C_{15}H_{15}Cl_5O$:

|  | C | H | Cl |
|---|---|---|---|
| Theoretical | 46.36 | 3.89 | 45.64 |
| Found | 45.95 | 4.00 | 45.91 |

EXAMPLE III

*Preparation of 1,2,3,4,7-Pentachloro-7-Ethoxybicyclo (2.2.1)-2,5-Heptadiene*

1,2,3,4,7,7 - hexachlorobicyclo (2.2.1) - 2,5-heptadiene (600 grams; 2.0 mol) was placed in a three-necked glass reaction vessel equipped with stirrer, thermometer, heating mantle and reflux condenser and containing potassium hydroxide (204 grams; 3.6 mol) and ethyl alcohol (670 grams; 14.6 mol). The reaction mixture was heated to reflux and allowed to reflux for 5 hours.

At the end of the five-hour reaction time, the unreacted alcohol was removed by use of reduced pressure. The residue from this distillation was immersed in water and extracted with diethyl ether. This ether layer was separated from the aqueous layer and dried over anhydrous sodium sulfate. The desired product was then recovered by distillation as the fraction boiling at 118° C. at 1.5 mm. Hg pressure. It was found to have a refractive index at 20° C. of 1.5330. It was analyzed for chlorine content of $C_9H_7Cl_5O$:

Theoretical _____ 57.48
Found _____ 57.50

Its structure is:

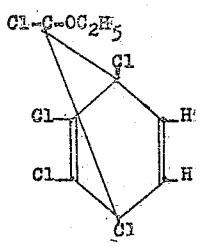

EXAMPLE IV

*Equimolar Adduction of 1,2,3,4,7-Pentachloro-7-Ethoxy-Bicyclo (2.2.1)-2,5-Heptadiene and Furan*

1,2,3,4,7 - pentachloro-7-ethoxybicyclo (2.2.1)-2,5-heptadiene (154 grams; 0.5 mol) is placed in a three-necked glass reaction vessel equipped with stirrer, thermometer, addition funnel and heating mantle and heated to about 110° C. Furan (81.6 grams; 1.2 mol) is added dropwise from the addition funnel into the reaction vessel uniformly over a period of 2 hours. The reaction mixture is maintained at approximately 110° C. for an additional 2 hours. At that time the reaction mixture is distilled under reduced pressure so as to recover the desired equimolar adduct, 1,2,3,4,10-pentachloro-10-ethoxy-1,4,4a,5,8,8a-hexahydro-1,4-methano-5,8-oxa-naphthalene.

EXAMPLE V

*Equimolar Adduction of 1,2,3,4,7-Pentachloro-7-Ethoxy Bicyclo (2.2.1)-2,5-Heptadiene and Cyclopentadiene*

1,2,3,4,7-pentachloro-7-ethoxy bicyclo (2.2.1)-2,5-heptadiene (60 grams; 0.19 mol) was placed in a three-necked glass reaction vessel equipped with stirrer, thermometer, addition funnel and heating mantle and heated to about 100° C. Cyclopentadiene (28.4 grams; 0.43 mol) was added dropwise from the addition funnel into the reaction vessel uniformly over a period of 1½ hours. The reaction mixture was maintained at approximately 100° C. for an additional 1½ hours, at which time the reaction mixture was distilled under reduced pressure with the desired adduct being recovered as the fraction boiling at 140° C. under 0.3 mm. Hg pressure. This product, 1,2,3,4,10 - pentachloro-10-ethoxy-1,4,4a,5,8,8a-hexahydro-1,4,5,8-dimethanonaphthalene, solidified and was found to have a melting point of 104.5–106° C.

It was analyzed for $C_{10}H_{13}Cl_5O$:

|  | C | Cl | H |
|---|---|---|---|
| Theoretical | 44.89 | 47.34 | 3.50 |
| Found | 45.03 | 47.40 | 3.70 |

EXAMPLE VI

*Equimolar Adduction of 1,2,3,4,7-Pentachloro-7-Ethoxy Bicyclo (2.2.1)-2,5-Heptadiene and Methyl Cyclopentadiene*

1,2,3,4,7-pentachloro-7-ethoxy bicyclo (2.2.1)-2,5-heptadiene (154 grams; 0.5 mol) is placed in a glass reaction vessel equipped with heating mantle, stirrer, thermometer and addition funnel and heated to about 110° C. Methyl cyclopentadiene (96.0 grams; 1.2 mol) is added dropwise from the addition funnel into the reaction vessel uniformly over a period of 1½ hours. The reaction mixture is maintained at approximately 110° C. for an additional 1½ hours. Then the desired equimolar adduct is obtained by distillation of the reaction mixture, namely, 1,2,3,4,10-pentachloro-10-ethoxy-1,4,4a,5,8,8a-hexahydro-6-methyl-1,4,5,8-dimethanonaphthalene.

EXAMPLE VII

*Preparation of 1,2,3,4,7-Pentachloro-7-Methoxy Bicyclo (2.2.1)-2,5-Heptadiene*

1,2,3,4,7,7 - hexachlorobicyclo (2.2.1)-2,5-heptadiene (604 grams; 2.02 mol) is placed in a three-necked glass reaction vessel equipped with stirrer, heating mantle, thermometer and reflux condenser and containing potassium hydroxide (190 grams; 2.90 mol) and methyl alcohol (480 grams; 15.0 mol). The reaction mixture is heated to reflux and maintained at reflux for approximately 4 hours. The unreacted material is removed by distillation under reduced pressure. The desired product is recovered by extracting the residue with diethyl ether, washing this extract with water, drying it over anhydrous sodium sulfate and a final distillation.

EXAMPLE VIII

*Equimolar Adduction of 1,2,3,4,7-Pentachloro-7-Methoxy Bicyclo (2.2.1)-2,5-Heptadiene and Butadiene*

1,2,3,4,7-pentachloro-7-methoxy bicyclo (2.2.1)-2,5-heptadiene (141.5 grams; 0.5 mol) is placed in a three-necked glass reaction vessel equipped with stirrer, heating mantle, thermometer and addition funnel and heated to about 100° C. 1,3-butadiene (59.4 grams; 1.1 mol) is added dropwise from the addition funnel into the reaction vessel uniformly over a period of 1½ hours. The reaction mixture is maintained at about 100° C. for an additional 1½ hours at which time the desired equimolar adduct, 1,2,3,4,10-pentachloro-10-methoxy-1,4,4a,5,8,8a-hexahydro-1,4-methanonaphthalene is recovered from the reaction mixture by distillation.

The above examples illustrate the preparation of the new compositions of matter of the present invention, but of course do not describe every specie contemplated by this invention which may be described as a composition obtained by the reaction consisting of the equimolar adduction of a conjugated diene, particularly cyclopentadiene, methyl cyclopentadiene, butadiene and furan, and the composition having the following structure:

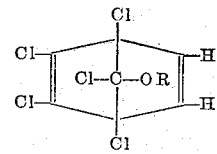

wherein R is an alkyl radical containing up to 14 carbon atoms.

This reaction is more commonly referred to as a Diels-Alder adduction with the composition of the above structure acting as the dienophile. As previously indicated, the dienophile of the present process is prepared by the reaction of 1,2,3,4,7,7 - hexachlorobicyclo (2.2.1)-2,5-heptadiene and the desired alcohol in the presence of an alkaline reacting material.

The following list describes the alcohols applicable in the present invention and the product of their reaction with 1,2,3,4,7,7-hexachlorobicyclo (2.2.1)-2,5-heptadiene in the presence of an alkaline reacting material. It is to be understood that the various isomers of these alcohols are equally applicable.

| Alcohol | Product |
|---|---|
| (1) methyl | 1, 2, 3, 4, 7-pentachloro-7-methoxy-bicyclo-(2.2.1)-2,5-heptadiene. |
| (2) ethyl | 1, 2, 3, 4, 7-pentachloro-7-ethoxy-bicyclo-(2.2.1)-2,5-heptadiene. |
| (3) butyl | 1, 2, 3, 4, 7-pentachloro-7-butoxy-bicyclo-(2.2.1)-2,5-heptadiene. |
| (4) propyl | 1, 2, 3, 4, 7-pentachloro-7-propoxy-bicyclo-(2.2.1)-2,5-heptadiene. |
| (5) pentyl | 1, 2, 3, 4, 7-pentachloro-7-pentoxy-bicyclo-(2.2.1)-2,5-heptadiene. |
| (6) hexyl | 1, 2, 3, 4, 7-pentachloro-7-hexoxy-bicyclo-(2.2.1)-2,5-heptadiene. |
| (7) heptyl | 1, 2, 3, 4, 7-pentachloro-7-heptoxy-bicyclo-(2.2.1)-2,5-heptadiene. |
| (8) octyl | 1, 2, 3, 4, 7-pentachloro-7-octoxy-bicyclo-(2.2.1)-2,5-heptadiene. |
| (9) nonyl | 1, 2, 3, 4, 7-pentachloro-7-nonoxy-bicyclo-(2.2.1)-2,5-heptadiene. |
| (10) decyl | 1, 2, 3, 4, 7-pentachloro-7-decoxy-bicyclo-(2.2.1)-2,5-heptadiene. |
| (11) undecyl | 1, 2, 3, 4, 7-pentachloro-7-undecoxy-bicyclo-(2.2.1)-2,5-heptadiene. |
| (12) dodecyl | 1, 2, 3, 4, 7-pentachloro-7-dodecoxy-bicyclo-(2.2.1)-2,5-heptadiene. |
| (13) tridecyl | 1, 2, 3, 4, 7-pentachloro-7-tridecoxy-bicyclo-(2.2.1)-2,5-heptadiene. |
| (14) tetradecyl | 1, 2, 3, 4, 7-pentachloro-7-tetradecoxy-bicyclo-(2.2.1)-2,5-heptadiene. |

This reaction can be performed in the presence or absence of solvent; under atmospheric pressure, superatmospheric pressure, or subatmospheric pressure; as a continuous process or a batch process; and with other like innovations.

In accordance with the present invention, the previously described ethers are reacted with a diene, particularly a diene selected from the group consisting of cyclopentadiene, methyl cyclopentadiene, furan and butadiene, in a Diels-Alder manner. This Diels-Alder adduction can be performed in the absence or presence of solvent, although it is preferred not to use solvent in order to simplify the recovery procedure. Temperatures between about 100° C. to about 200° C. are satisfactory, although lower or higher temperatures can be used. This reaction can be performed at pressures below or above atmospheric pressure and as a batch or continuous process, the latter being desirable from an economic viewpoint.

Thus the compounds of the present invention can be said to be represented by the group consisting of the following structural formulas:

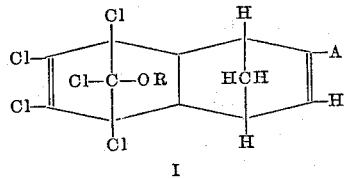

I and

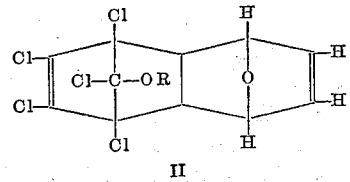

II and

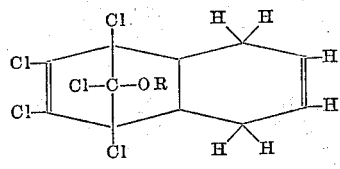

III wherein R is an alkyl radical containing up to 14 carbon atoms and A is selected from the group consisting of hydrogen and methyl.

For example, when cyclopentadiene (a) is utilized as the diene, the product has the structural formula of I wherein A is hydrogen; when methyl cyclopentadiene (b) is utilized as the diene, the product has the structural formula of I wherein A is methyl; when furan (c) is utilized as the diene, the product has the structural formula of II; and when butadiene (d) is utilized as the diene, the product has the structural formula of III.

Exemplary of the compounds of the present invention and their preparation are the following wherein the reactants are numbered and lettered as hereinbefore indicated:

1,2,3,4,10-pentachloro-10-methoxy - 1,4,4a,5,8, 8a- hexahydro - 1,4,5,8 - dimethanonaphthalene _____ (1)+(a)

1,2,3,4,10-pentachloro-10- butoxy - 1,4,4a,5,8, 8a- hexahydro - 1,4,5,8 - dimethanonaphthalene _____ (4)+(a)

1,2,3,4,10-pentachloro-10-heptoxy - 1,4,4a,5,8, 8a-hexahydro - 1,4,5,8 - dimethanonaphthalene _____ (7)+(a)

1,2,3,4,10-pentachloro-10 - nonoxy - 1,4,4a,5,8, 8a- hexahydro - 1,4,5,8 - dimethanonaphthalene _____ (9)+(a)

1,2,3,4,10-pentachloro-10-tridecoxy-1,4,4a,5,8, 8a- hexahydro - 1,4,5,8 - dimethanonaphthalene _____ (13)+(a)

1,2,3,4,10-pentachloro-9- methoxy - 1,4,4a,5,8, 8a-hexahydro-1,4-methano-5,8-oxa-naphthalene _____ (1)+(c)

1,2,3,4,10-pentachloro-9 - propoxy - 1,4,4a,5,8, 8a-hexahydro-1,4-methano-5,8-oxa-naphthalene _____ (3)+(c)

1,2,3,4,9-pentachloro-9-pentoxy - 1,4,4a,5,8,8a-hexahydro-1,4-methano- 5,8 - oxa - naphthalene _____ (5)+(c)

1,2,3,4,9-pentachloro-9 - isooctoxy - 1,4,4a,5,8, 8a-hexahydro-1,4-methano-5,8-oxa-naphthalene _____ (8)+(c)

1,2,3,4,9-pentachloro-9- decoxy - 1,4,4a,5,8,8a-hexahydro-1,4-methano-5,8 - oxa - naphthalene _____ (10)+(c)

1,2,3,4,9-pentachloro-9-tetradecoxy-1,4,4a,5,8, 8a-hexahydro-1,4-methano-5,8-oxa-naphthalene _____ (14)+(c)

1,2,3,4,9-pentachloro-9- ethoxy - 1,4,4a,5,8,8a-hexahydro-1,4-methanonaphthalene _____ (2)+(d)

1,2,3,4,9-pentachloro - 9 - isopropoxy - 1,4,4a, 5,8,8a - hexahydro - 1,4 - methanonaphthalene _____ (3)+(d)

1,2,3,4,9-pentachloro-9-hexoxy - 1,4,4a,5,8,8a-hexahydro-1,4-methanonaphthalene _____ (6)+(d)

1,2,3,4,9-pentachloro-9- octoxy - 1,4,4a,5,8,8a-hexahydro-1,4-methanonaphthalene _____ (8)+(d)

1,2,3,4,9-pentachloro- 9 - dodecoxy-1,4,4a,5,8, 8a-hexahydro-1,4-methanonaphthalene ___ (12)+(d)

1,2,3,4,9 - pentachloro - 9 - tetradecoxy - 1,4, 4a,5,8,8a-hexahydro - 1,4 - methanonaphalene _____ (14)+(d)

1,2,3,4,10-pentachloro-10-methoxy- 1,4,4a,5,8,
  8a-hexahydro-6-methyl-1,4,5,8 - dimethano-
  naphthalene _____ (1)+(b)
1,2,3,4,10-pentachloro-10 - butoxy - 1,4,4a,5,8,
  8a-hexahydro-6-methyl-1,4,5,8 - dimethano-
  naphthalene _____ (4)+(b)
1,2,3,4,10-pentachloro-10-heptoxy - 1,4,4a,5,8,
  8a-hexahydro-6-methyl-1,4,5,8 - dimethano-
  naphthalene _____ (7)+(b)
1,2,3,4,10-pentachloro-10- nonoxy - 1,4,4a,5,8,
  8a-hexahydro-6-methyl-1,4,5,8 - dimethano-
  naphthalene _____ (9)+(b)
1,2,3,4,10-pentachloro-10-undecoxy - 1,4,4a,5,
  8,8a-hexahydro-6-methyl-1,4,5,8-dimethano-
  naphthalene _____ (11)+(b)
1,2,3,4,10-pentachloro-10-tetradecoxy - 1,4,4a,
  5,8,8a-hexahydro-6-methyl-1,4,5,8 - dimeth-
  anonaphthalene _____ (14)+(b)

As previously described, all of the present compounds can be prepared by the adduction of the appropriate hexachlorobicycloheptadiene ether and a diene selected from the group consisting of cyclopentadiene, methyl cyclopentadiene, butadiene and furan in a Diels-Alder manner. The ether group of the dienophile will not be affected by this reaction and thus will be a constituent of the final product.

As previously indicated, the compositions of the present invention have superior insecticidal activity. This desirable propensity is verified by the following data which shows the high toxicity of the compositions of the present invention to various undesirable organisms. In all of the following tests the compound tested was the product of the equimolar adduction of 1,2,3,4,7-pentachloro-7-isopropoxybicyclo (2.2.1)-2,5-heptadiene and cyclopentadiene.

In all of these tests the test compound was formulated into a 10% wettable powder, dispersed in water at the indicated concentration of actual chemical and applied by dipping the cranberry bean host plants therein. After the treated plants had dried, untreated insects were caged thereon.

| Organism | Percent Actual Compound | Percent Mortality 48 Hours After Treatment |
|---|---|---|
| Mexican Bean Beetle | 0.2 | 100 |
| Southern Armyworm | 0.4 | 100 |
| Do | 0.2 | 100 |
| Do | 0.1 | 100 |
| Do | 0.05 | 100 |
| Do | 0.025 | 80 |

Also, this compound was tested as a residual insecticide against the housefly. In this test two milliliters of a one-percent solution of said compound was applied to a 125 mm. filter paper. The solvent was volatilized and houseflies were caged in hemispherical wire mesh cages over the treated filter paper for 24 hours, at the end of which time the percent mortality of the houseflies was 100%.

These compositions may be used in their pure form or they may be mixed with other insecticides. They may be applied in a variety of ways to the area and materials which are to be protected against the undesirable insect pests, such as by dusting, spraying, dipping, tumbling, etc. In most cases it will be desirable to formulate them with carriers. Carriers may be liquid, for example, various oils and hydrocarbons, or solid.

Compositions may be formulated by mixing the active ingredients with the desired carrier by means known to the art of formulation. Carriers which may be used include diatomaceous earth, fuller's earth, bentonite, lime products, and the like.

When a solid carrier is employed, it is desirable that the formulation be in a finely divided form. This may be obtained by grinding. It is often advantageous to add small amounts of wetting agents to the formulation. For spray application the active ingredient may be dissolved or dispersed in a suitable liquid carrier. Spray compositions containing the active ingredient in the form of a solution, suspension, dispersion or emulsion may be employed.

The following formulations may be used:

FORMULATION A

| | Percent by weight |
|---|---|
| Product of Example II | 25 |
| Celite 209 | 75 |

"Celite 209" is a diatomaceous earth.

FORMULATION B

| | Percent by weight |
|---|---|
| Product of Example IV | 50 |
| Micro Cel A | 47 |
| Triton X-100 | 3 |

"Micro Cel A" is a synthetic, relatively inert, porous material consisting substantially of calcium silicate. "Triton X-100" is a wetting agent, chemically being an alkyl aryl polyether alcohol. This formulation is a wettable powder.

FORMULATION C

| | Percent by weight |
|---|---|
| Product of Example V | 60 |
| Isopropyl acetate | 23 |
| Isopropyl alcohol | 10 |
| Atlas G-1690 | 7 |

"Atlas G-1690" is a commercially obtainable emulsifier. This formulation is an emulsifiable concentrate.

In addition to its above demonstrated insecticidal activity, the compositions of the present invention are also valuable as chemical intermediates. There can be prepared from it several highly useful compounds. These compounds are prepared by reaction of the unsaturated carbon to carbon bond located in the portion of the molecule not a part of its bicyclo-heptane moiety.

Thus, the compositions of the present invention may be oxidized, halogenated, and other reactions performed with this unsaturated linkage as are performable with other olefinic bonds. However, the products when using the present compositions of matter contain the valuable pentachlorobicycloheptene ether configuration.

I claim as my invention:

1. A new composition of matter selected from the group consisting of:

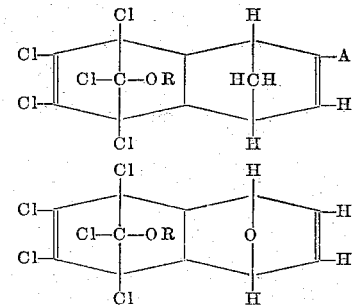

and

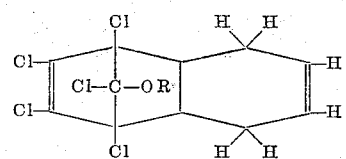

wherein R is an alkyl radical containing up to 14 carbon atoms and A is selected from the group consisting of hydrogen and methyl.

2. 1,2,3,4,10 - pentachloro - 10 - ethoxy - 1,4,4a,5,8,8a-hexahydro-1,4,5,8-dimethanonaphthalene.

3. 1,2,3,4,10 - pentachloro - 10 - isopropoxy - 1,4,4a,5, 8,8a-hexahydro-1,4,5,8-dimethanonaphthalene.

4. 1,2,3,4,9 - pentachloro - 9 - ethoxy - 1,4,4a,5,8,8a-hexahydro-1,4-methano-5,8-oxa-naphthalene.

5. 1,2,3,4,9 - pentachloro - 9 - methoxy - 1,4,4a,5,8,8a-hexahydro-1,4-methanonaphthalene.

6. 1,2,3,4,9 - pentachloro - 9 - ethoxy - 1,4,4a,5,8,8a-hexahydro-6-methyl-1,4,5,8-dimethanonaphthalene.

References Cited in the file of this patent

UNITED STATES PATENTS

| | | |
|---|---|---|
| 2,635,979 | Lidov | Apr. 21, 1953 |
| 2,655,513 | Kleiman | Oct. 13, 1953 |
| 2,655,514 | Kleiman | Oct. 13, 1953 |
| 2,697,103 | Ordas | Dec. 13, 1954 |

OTHER REFERENCES

Frear et al.: Journal of Economic Entymology, vol. 40 (1947, pages 736–41).

Patterson et al.: The Ring Index (second edition, 1960), pages 329 and 540.

UNITED STATES PATENT OFFICE
CERTIFICATE OF CORRECTION

Patent No. 3,031,464

April 24, 1962

Hyman M. Molotsky

It is hereby certified that error appears in the above numbered patent requiring correction and that the said Letters Patent should read as corrected below.

Column 6, lines 44 and 47, for "1,2,3,4,10-", each occurrence, read -- 1,2,3,4,9- --.

Signed and sealed this 9th day of October 1962.

(SEAL)
Attest:

ERNEST W. SWIDER
Attesting Officer

DAVID L. LADD
Commissioner of Patents